Aug. 27, 1929.  S. A. HOGE  1,726,351
RAT TRAP
Filed Feb. 10, 1928
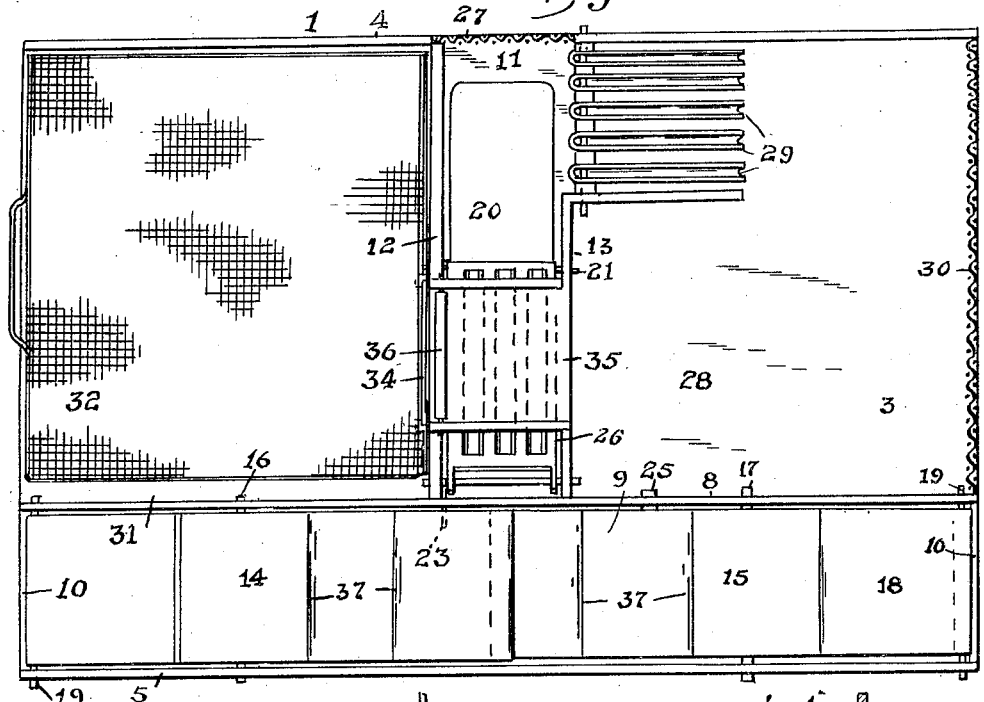
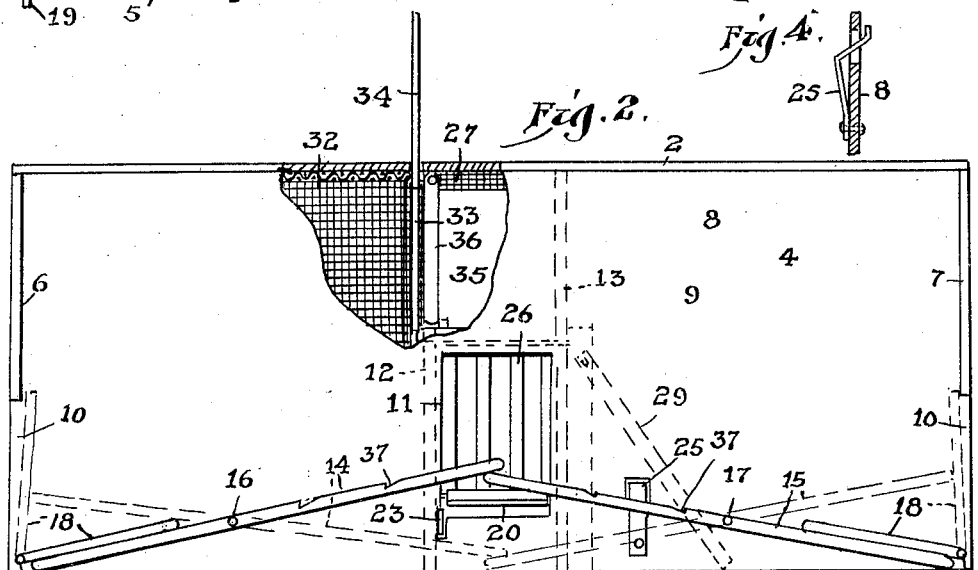
INVENTOR.
Smith A. Hoge
BY
ATTORNEY Patented Aug. 27, 1929.

1,726,351

UNITED STATES PATENT OFFICE.

SMITH A. HOGE, OF RICES LANDING, PENNSYLVANIA.

RAT TRAP.

Application filed February 10, 1928. Serial No. 253,349.

My invention relates to rat traps, and important objects thereof are to provide a rat trap of the character described, which will automatically effect the capture of a number of rats without requiring resetting, which will prevent the escape of trapped rats, which is simple in its construction and arrangement, strong, durable and efficient in its use, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a top view of my improved rat trap with the top removed therefrom.

Figure 2 is a longitudinal sectional view thereof.

Figure 3 is an enlarged detail view of the runways securing and releasing mechanism.

Figure 4 is a detail view of the resilient restraining clip.

Referring in detail to the drawing 1 denotes a casing comprising a top 2, bottom 3, side walls 4 and 5, and end walls 6 and 7. A partition wall 8 is disposed parallel and adjacent to the side wall 5 forming a main passageway 9 therebetween. The passageway 9 extends throughout the length of the casing 1 and is provided with openings 10 at the ends thereof. A side passageway 11 is formed by a pair of spaced partition walls 12 and 13. The side passageway 11 connects with the main passageway 9, centrally of the length of the latter, and extends at right angles relatively thereto.

A pair of associated runways 14 and 15 are mounted in the main passageway 9. The runways 14 and 15 are pivotally connected, as respectively indicated at 16 and 17, in the side wall 5 and the partition wall 8. Doors 18, for closing the openings 10, are hinged at their lower ends, as at 19, to the casing bottom 3. The doors 18 normally fall inwardly by gravity to their open position, upon respective outer end portions of the runways 14 and 15. The pivotal connection 17, of the runway 15 is such that the outer portion overbalances the inner portion thereof, whereby the latter is normally tilted upwardly. The pivotal connection 16, of the runway 14 is such that the inner portion normally overbalances the outer portion thereof, even when the open door 18 is resting on the latter. However, the inner portion of the runway 14 is normally tilted upwardly as the inner end thereof overlaps the adjacent inner end of the upwardly tilted runway 15, as clearly shown in Figure 2.

A treadle member 20 is mounted in the side passageway 11 and pivotally connected, as at 21, to the partition walls 12 and 13. The treadle member 20 carries a fixed, vertically extending arm, 22, which is disposed at the treadle member connection 21. The treadle member 20 is balanced on its connection 21 to normally extend horizontally in the passageway 11.

The rat enters the trap through either of the openings 10 at respective ends of the passageway 9. The weight of the rat upon the runways 14 and 15 will force the tilted ends thereof downwardly, until the runways 14 and 15 extend approximately horizontal, as shown in dash lines in Figure 2. When the runways 14 and 15 are shifting to such horizontal position, the outer ends thereof will actuate the doors 18 and shift the latter to the closing position against respective passageway openings 10.

A spring catch 23 is mounted in the partition wall 8 and normally projects in the main passageway 11 in the path of movement of the inner portion of the runway 14. A releasing rod 24 connects the catch 23 with the top of the arm 22. When the runway 15 is depressed by the weight of the rat, as hereinbefore stated, the lower end of the spring catch 23, by its resilient action, will engage the top of the inner portion of the runway 14 and maintain the runway 14 in the depressed position. As the inner end of the runway 14 overlaps the inner end of the runway 15 the latter will be depressed and secured simultaneously with the former. A resilient restraining clip 25 is attached to the inner side of the partition wall 8 and normally engages the adjacent side edge of the inner portion of the runway 15 for the purpose of steadying and retarding the depressing movement of the latter until the rat is well upon it, and further to synchronize the movement thereof with the gravity operated depression of the inner portion of the associated runway 14.

An integrally formed gate 26, is mounted in the side passageway 11 and closes the entrance from the main passageway 9 to the latter. The gate 26 is pivotally connected at its upper end to the partition walls 12 and 13, and is free at its lower end. The gate 26 is disposed at an angle having its lower free end disposed forwardly in the side passageway 11, and resting on the treadle member 20. The outer end of the side passageway 11 is covered with mesh wire 27 which is fixed in an opening in the casing side wall 4, and the gate 26 is formed by a plurality of spaced bars, to provide light to entice the rat from main passageway 9 into the side passageway 11. The pivotal connection and inclination of the gate 26 allows the rat to operate the latter to enter the side passageway 11 but prevents its return therefrom into the main passageway 9. As the rat enters the side passageway 11, its weight on the outer portion of the treadle member 20, will depress the latter, thereby effecting the release of the catch 23 from the runway 14 and permitting of the return of the runways 14 and 15 to their normal tilted positions and the consequent return of the doors 18 to the open positions, allowing the entrance of the following rat into the main passageway 9.

A chamber 28 is formed on one side of the side passageway 11, and an entrance in the outer end of the partition wall 13 establishes communication between the side passageway 11 and the chamber 28. A plurality of separate, closely spaced inclined bars 29, pivotally connected at their upper and free at their lower ends, project into the chamber 28 and close the entrance between the side passageway 11 and the chamber 28. The bars 29 and the bars of the gate 26 are substantially V-shaped in transverse cross section with the converging sides disposed toward respective passageways 9 and 11. The disposition and transverse contour of the bars of the gate 26 and the bars 29 facilitate entrance therethrough from passageways 9 and 11, but render return therethrough extremely difficult. The casing end 7 is provided with an opening covered with mesh wire 30 to provide light in the chamber 28.

A chamber 31 is formed on the other side of the side passageway 11 and is provided for the reception of a removable cage 32, having a corresponding contour. The latter is formed with an opening 33 and closure member 34 for the latter. A passageway 35 extends transversely across the upper end of the side passageway 11 and establishes communication between the chamber 28 and the cage 32. A door 36 pivoted at its upper end normally closes the forward end of the passageway 35. The door 36 is arranged to swing forwardly into the cage opening 33 but not rearwardly into the passageway 35.

The rat can operate the suspended door 36 and enter the cage 32 through the passageway 35, but the door 36 will swing, by gravity, to closed position and prevent the return of the rat therethrough in the direction of the passageway 35.

Before removing the cage 32 with the trapped rats, the closure member 34 is shifted to close the cage opening 33.

The bait for enticing rats is preferably placed in the transversely extending grooves 37 formed in the runways 14 and 15, but may be suspended from the casing top 2 at any position to best meet conditions found in practice. If desired, a tank of water may replace the cage 32 in the chamber 31 whereby the rats are drowned instead of being captured alive.

The labyrinth of passageways and chambers, embodied in my improved rat trap, through which the rats must necessarily pass before finally entering the cage 32, renders escape therefrom absolutely impossible.

What I claim is:

In a rat trap of the character described, a casing providing a chamber and formed with a main passageway and with a side passageway, the latter communicating with said main passageway and with said chamber, each end of said main passageway having an entrance opening, a closure member for each of said entrance openings, a pair of runways pivotally connected in said main passageway and depressible for simultaneously shifting said closure members to close said openings, a treadle member pivotally mounted in said side passageway, means for securing said pair of runways in the depressed position to maintain said closure member in the closed position, means connected with said first mentioned means and with said treadle member for releasing said pair of runways from the depressed position for shifting said closure member to the open position, a pair of gates for respectively closing the communication between said side passageway and said main passageway and said chamber, said gates consisting of a plurality of bars substantially V-shaped in transverse cross section.

In testimony whereof I affix my signature.

SMITH A. HOGE.